Figure 1A:
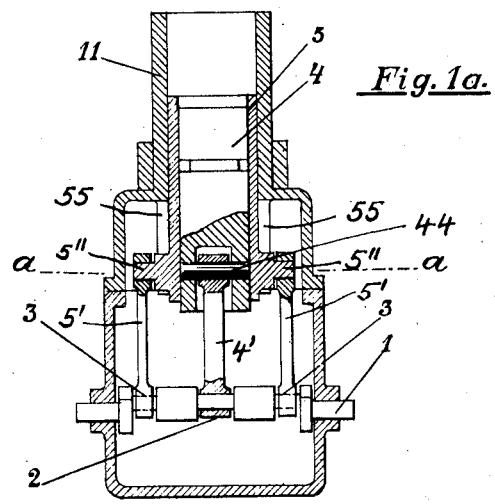

Dec. 18, 1928.
K. JUHASZ
PRESSURE INDICATOR
Filed Oct. 1, 1923
1,695,591
2 Sheets-Sheet 1
*Fig.1*
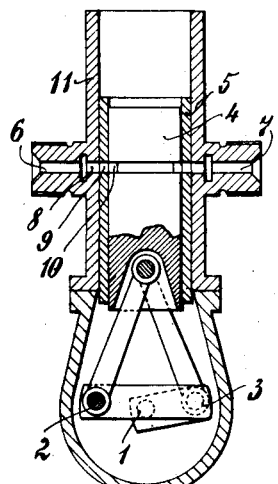
*Fig.3*
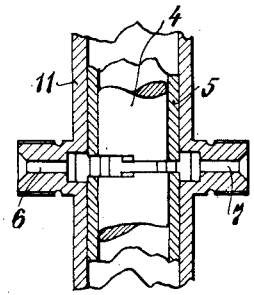
*Fig.5*
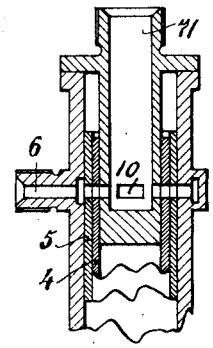
*Fig.2*
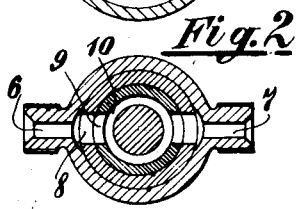
*Fig.4*
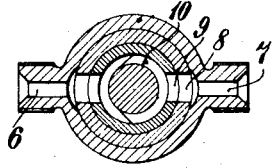
*Fig.6*
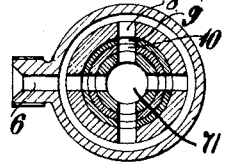
*Fig.7*
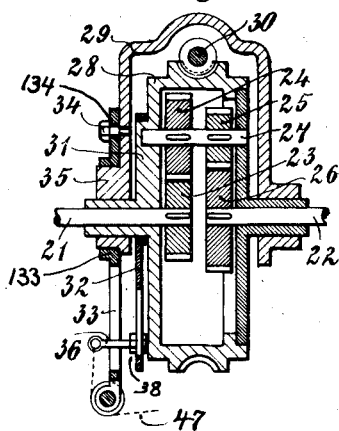
*Fig.9*
*Fig.10*
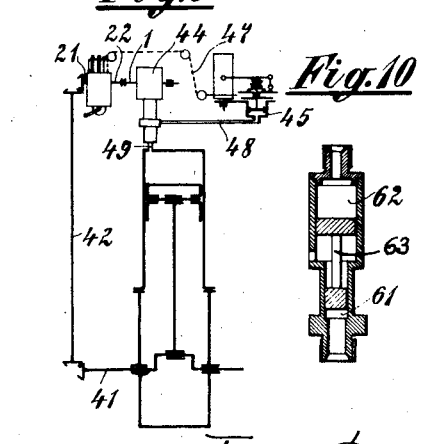
Inventor:-
Kalman Juhasz
by
Attorney Dec. 18, 1928.

K. JUHASZ

PRESSURE INDICATOR

Filed Oct. 1, 1923    2 Sheets-Sheet 2

1,695,591

Inventor
Kalman Juhasz
by
Attorney

Patented Dec. 18, 1928.

1,695,591

UNITED STATES PATENT OFFICE.

KALMAN JUHASZ, OF HAMBURG-WANDSBECK, GERMANY.

PRESSURE INDICATOR.

Application filed October 1, 1923, Serial No. 665,844, and in Germany February 15, 1923.

The present invention has reference to improvements in pressure indicators and relates more specifically to indicators for recording the pressure diagrams of high speed piston engines.

There are already known indicating instrumentalities for testing and recording the pressure phenomena in high speed engines by means of which the complete diagram is recorded not during a single cycle but during a series of successive cycles for the purpose of eliminating as much as possible the disturbing influence of the inertia of the pressure measuring and piston displacement measuring elements of the indicator proper.

These indicating devices are based on the broad principle that a valve member positively driven from the engine under test is interposed between the engine cylinder and the cylinder of an ordinary low speed indicator. The valve member operatively connects these two cylinders only during a fraction of each of the succeeding cycles, and in a certain definite phase thereof. This period of communication is for such a small fraction of the total tested cycle that during such period the pressure can be regarded as constant.

This testing phase of communication between the two cylinders can be shifted around the complete cycle, producing a relative displacement of the valve parts and causing at the same time a displacement of the indicator drum to an extent corresponding to the variables, such as piston displacement or crank angle, as the function of which variables the pressure phenomena are to be recorded.

In order to illustrate this principle by an example the already known proposition may be cited, i. e., to employ a cylindrical valve having a port opening rotated positively by the engine to be tested within another hollow cylinder having a similar port which latter cylinder is rotatable manually. By means of rotation of the manually rotatable cylinder the phase of the cycle in which the communication occurs can be altered at will. In this instrumentality the functions of effecting the communication and altering the phase are both effected by the valve elements themselves.

In order to make the operation of an indicating instrumentality successful the fulfillment of the following requirements is of material importance:

(1) The valve element has to keep tight under the strenuous circumstances of service, i. e., high pressures and temperatures; otherwise a leakage from the indicator cylinder results which impairs the reliability of the pressure measurement.

(2) The duration of the communicating period must be a small fraction of the total duration of the tested cycle, that is to say, the valve has to open and close very rapidly; otherwise the pressure of the tested cycle during the period of communication cannot be regarded as constant, which is presupposed by the broad principle as above outlined.

My invention consists in providing means which renders possible the fulfillment of the two above-mentioned requirements in a more thorough manner than was possible with instruments hitherto proposed, and by means of which they may be secured.

This improvement can be broadly stated to consists in the division and coordination of the two functions, to wit:

(1) altering the phase to be tested,
(2) effecting the communication.

Owing to this division of the functions the elements best suited for each of the two particular purposes can be employed. Thus in my invention:

(1) For the altering of the phase to be tested a planetary gear mechanism partly operated by the engine to be tested and adjustable by hand for phase changing actions is used, which mechanism is not exposed to the influence of heat or pressure;

(2) For effecting the communication the valve elements consists of cylindrical sliding members arranged one within the other and reciprocating reversely in an axial direction. This form of valve has been already found satisfactory for other kinds of service (e. g. valve gear for piston engines). Its application for the purpose of indicating and the special construction which suits this particular purpose is novel.

As a third element, a pressure reducer is interposed between the cylinder under test and the valve element proper in order to cope with exceptionally high pressures (e. g. oil pumps for Diesel engines).

Figure 1B:
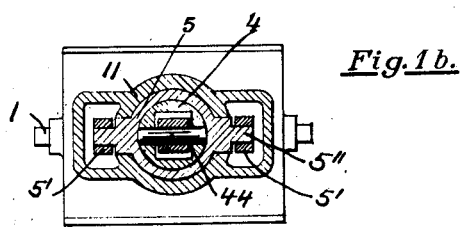
Figure 8:
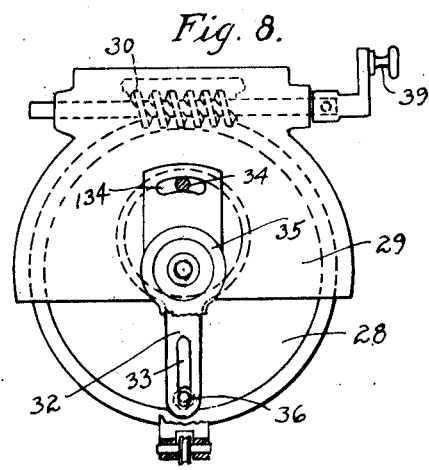

My invention will be best understood when described in connection with the accompanying drawings, in which: Fig. 1 is a vertical section through the valve mechanism with the twin oppositely reciprocating slides; Fig. 1ª is a similar section through the valve mechanism taken at right angles to that shown shown in Fig. 1; Fig. 1ᵇ is a cross-section through Fig. 1ª on line a—a in the plane of the upper articulations; Fig. 2 is a horizontal section through Fig. 1 in the plane of the valve passages; Figs. 3 and 4 respectively show vertical and horizontal sections through a modification; Figs. 5 and 6 show similar sections of still another modification; Fig. 7 is a vertical section through the phase shifting mechanism of which Fig. 8 is a side elevation; Fig. 9 is a diagrammatical view of the complete installation; and Fig. 10 is a longitudinal section through the pressure controller.

Referring first to the diagrammatical view of the whole installation, Fig. 9 shows the different elements mounted on an engine which in the following description shall be assumed to be a four stroke cycle engine. With the cylinder space of this engine a valve element 44 is connected by means of a short pipe 49. From this valve element 44 another pipe 48 leads to the cylinder of an ordinary indicator 45. This indicator is assumed to be of ordinary steam engine type having a spring loaded piston freely movable within a cylinder which serves for the measurement of the pressure, and a rotatable recording drum which carries the card for the measurement of the piston displacement. This drum, as usual, may be spring operated in one direction and operated by a cord 47 in the reverse direction. Whenever the valve 44 is open communication is established between the cylinder space of the engine and the indicator cylinder. The valve element is actuated by the rotating shaft 1 and is assumed to be of such construction that it admits one communication for each revolution of the shaft 1. This shaft 1 is connected with the secondary shaft 22 of the phase shifting planetary gear, the primary shaft 21 of which is positively driven from the engine, by a bevel wheel drive 41, 42 and 21. The primary shaft 21 runs at crank-shaft speed. In the planetary gear a 2:1 speed reduction takes place so that the secondary shaft 22, which is immediately connected with the valve shaft 1, runs at the cam-shaft speed. Thus the valve admits during each cycle one communication between the engine cylinder and the indicator cylinder. By means of this planetary gear, in a manner to be described later in detail, an additional angular movement may be imparted by manual means to the shafts 22 and 1 to alter the phase of the cycle in which the communication is effected by the valve 44. When the tested phase is altered, the drum of the indicator proper 45 is at the same time moved by means of cord 47 an amount which corresponds to the change of variable (piston displacement or crank angle) pertaining to the altered phase of the cycle.

The phase controller is shown in Figs. 7 and 8, and it consists essentially of a planet gear composed of three rotatable members one of which (hereinafter called the primary member) is positively driven by the engine; the second (hereinafter called the secondary member) is connected by a positive drive with the valve element, and the third (hereinafter called the tertiary member) which may be held stationary and also may be rotated by hand or by some other external means whenever changing the phase under test is desired.

In the embodiment of my invention the primary member is the shaft 21 which is assumed to be driven at crank-shaft speed from the engine to be tested. The secondary member is the shaft 22 which is positively connected with the valve element. The primary and secondary shafts are connected by gears 23, 24, 25, and 26 in such a manner that the secondary shaft 22 is driven at just half the speed of the primary shaft 21. The gears 24 and 25 are fixed on the common shaft 27 which is rotatably journaled in casing 28, which latter constitutes the tertiary member. This latter can be relatively displaced within the stationary frame 29, i. e., rotated on an axis coincident with axes 21–22, by means of the worm 30 which later is manually operable by means of a crank 39 or by some other suitable means. By rotating the worm 30 the shaft 22 can be additionally rotated relative to shaft 21.

As long as the tertiary member, i. e., the casing 28, is not rotated the passages of the pressure medium will always occur at the same phase of the consecutive cycles. Upon the tertiary member being displaced through the angle $x$ the passage of the pressure medium will occur at a different phase corresponding to a crank position advanced or retarded by the angle $y$. By suitably choosing the gears 23, 24, 25 and 26 it is attained that $x=y$, i. e., two complete revolutions of the tertiary member, are necessary to complete one cycle of a four stroke cycle engine.

From the tertiary member the movement of the indicator drum is derived. If the diagram of the pressure change as a function of the crank-angle is to be obtained (pressure crank-angle open diagram), the rotation of the tertiary member can be simply transmitted to the indicator drum by means of an endless string or the like. In most cases, however, a closed pressure piston stroke diagram is what is required, and I shall proceed to describe the mechanism serving for this purpose. To this end the rotary movement of the tertiary member 28 is converted into a reciprocating motion by means of a crank and connecting rod mechanism which is adjustable to have the same ration (crank radius to connecting rod length) as that obtaining in the engine under test. This is realized in the embodiment shown on Figs. 7 and 8 in such a manner that on the tertiary member an eccentrical boss 31 is formed on which an eccentric strap carried by a rod 32 is rotatably mounted. In a radial slot formed in rod 32 the pin 36 is arranged in such a manner that it can be slid along the rod until the value of the ratio: eccentricity of 31 to the distance from the geometric center of 31 to pin 36, is the same as the ratio: crank radius of the engine under test to its connecting rod length. In this position the pin 36 is rigidly clamped in the slot of 32 by means of nut 38. The pin 36 can execute a reciprocating movement within the radial guide slot 33 in an arm carried by a hub member 35, hereinafter referred to and to said pin is fastened the cord 47 by means of which the reciprocating movement of 36 is transmitted to the recording drum of the indicator. The object of the above-described adjustment is to correlate the distance traveled by the indicator drum to the distance of the engine piston from its dead center for the phase under test, allowing for the angularity of the connecting rod.

Obviously, the engine and the indicating apparatus have to be correlated in such a manner that the tested phase of the engine is the same as the phase shown on the eccentric mechanism 31, 32 and 36; otherwise a displaced diagram would result. This adjustment is obtained roughly by the initial connecting up of the shaft 21 to the shaft of the engine. The fine adjustment can be accomplished within small limits by means of turning the member around the hub 35 of the stationary casing 29 on which it is rotatably mounted until it occupies the exact position and then fixing it with a clamping screw 34, which latter passes through a slot 134 in the hub and is threaded in the case 29.

The construction of the planet gear within the province of the present invention may vary, for example, the primary and tertiary members may be interchanged, 21 serving for tertiary member while 28 being actuated from the engine as the primary member. Evidently, in this case the eccentric mechanism which actuates the recording drum of the indicator has to be formed on shaft 21. Obviously also, the gearing ratio of the planet gear may be altered in particular cases in order to provide for being driven at other speeds than was assumed in the foregoing description. The crown wheels may be replaced by bevel wheels.

In case of indicating two stroke engines the arrangement as described above may be used without any alterations, the sole effect being that only every second cycle is used for the purpose of indicating. In this case also a type of valve mechanism which admits of two openings for each revolution of its actuating shaft 21, resp. 1 can be employed. Or, if a valve type admitting only one communication for each revolution of its shaft 1 is used, then it can be, instead of being coupled directly to shaft 21, driven from it with a 2:1 gear.

So far I have referred to the actuating shaft 1 (Fig. 9) of the valve element in a general manner. In fact the phase controller described above can be used in connection with any type of valve, be it a rotating valve of cylindrical, conical or disk form, cam operated tappet valve or the like. A type of reciprocating slide valve which I have specially designed and developed for this purpose has, however, been found entirely satisfactory in actual practice and this type of valve I shall proceed to describe in detail.

One embodiment of the slide valve is shown in Figs. 1, 1ª 1ᵇ, and 2. The two valve slides in the shape of two nested cylinders 4 and 5 are driven in opposite directions from the shaft 1 by means of the cranks 2 and 3. The inner valve 4 is operated from the crank pin 2 by the connecting rod 4' engaging the cross pin 44. The outer valve 5 is operated from the crank pin 3 by means of connecting rods 5' engaging gudgeons on the valve 5 and suitably guided in the cylinder 11 for instance, as shown, in slots 55. The cranked portions 2 and 3 of the shaft 1 are relatively displaced through 180° or slightly less and thus operate the nested slide valves in opposite directions. One of the ports, for instance port 6 is to be connected to the engine cylinder under test and the other port 7 to the indicator cylinder. The two cylinders are in unobstructed communication when the ports or passages 8, 9 and 10 of the two slide members and of the casing 11 are in register. This position is shown in Fig. 1. The communication is established or interrupted at the moment the slides reach their maximum speed.

Since in the present valve mechanism a tight fit is of the greatest importance I have found cylindrical slide members especially serviceable owing to the high degree of accuracy with which such cylinders can be machined and fitted. An advantage of decided importance is that the tight fit is less influenced by distortion owing to heat, and there is less liability to scoring or binding than in other types of valve, not excepting rotary valves.

For a quick exchange of pressure in front and back of the valve it is important that the resistance of the valve mechanism to the passage of the pressure medium be kept as low as possible. This can be obtained either by shortening the length of the passage or by increasing the cross sectional area thereof.

In the constructional modification of the valve ports or passages according to Figs. 3 and 4 the length of the slide passage is reduced by providing the slides at one side with a wide aperture or slot and at the other side with a narrower aperture or slot. The period of open communication, which should be as short as possible, obviously is controlled by the size of narrow slot. This important modification has in practice greatly improved the sharpness of the diagrams. In the constructional modification in Figs. 5 and 6 I obtain the enlargement of the cross section of the passage, without at the same time having to enlarge the apparatus as such, by providing a relatively large portion of the slide surface with ports or passages. In this embodiment I have disposed one of the exhaust pipes 71 concentrically within the slide cylinders as clearly shown.

The recording indicator proper, the phase controller and the valve element form an instrumentality with the aid of which it is possible to take indicator cards on a high speed engine. Nevertheless, for special cases in which in the chamber under test excessive pressures are apt to occur, it is desirable to interpose a pressure reducer as shown by way of example in Fig. 10 between the tested chamber and the valve mechanism. This reducer comprises two coaxially disposed cylinders of unequal diameters in which play two pistons of correspondingly different diameters mounted on a common shaft 63. The smaller cylinder 61 communicates with the chamber under test and the larger cylinder 62 with the valve mechanism. The cylinder 62, the connecting pipes 48 and the indicator cylinder should be filled with oil or other suitable liquid. In this instance the pressures within the cylinders 62 and 61 are inversely proportional to the piston cross sections. Obviously this pressure controller can also be used to step up weak pressures.

What I claim is:—

1. In a pressure indicator of the character described, a phase controller comprising a primary shaft driven by the engine under test, a secondary shaft for transmitting motion to a pressure controlling valve, gears on said shafts, a casing adjustable in an arc concentric with the shafts, a shaft journaled in the casing, gears carried by said shaft and meshing with the gears on the first-named shafts, and means for adjusting the casing and fixing it in adjusted position.

2. In a pressure indicator of the character described, a phase controller comprising primary and secondary shafts adapted, respectively, to be driven by the engine under test and to transmit motion to a pressure controlling valve, gears carried by the shaft, a third member rotatably mounted on the first-named shafts, said member having a head eccentric to the shaft driven by the engine, gears carried by the third member and meshing with the first-named gears, means for rotatably adjusting the third member and fixing it in adjusted position, an eccentric strap engaging said eccentric head and provided with a radial arm, and a pin carried by said arm for transmitting motion to an indicator, said pin being adjustable longitudinally of the arm.

3. In a pressure indicator of the character described, a phase controller comprising a primary shaft designed to be driven by the engine under test, a secondary shaft for transmitting motion to a pressure controlling valve, gears on said shafts, a casing rotatably adjustable on said shafts as an axis and provided with an eccentric head, gears carried by the casing and meshing with the first-named gears, a stationary frame having an eccentric head, means for adjusting the casing and fixing it in adjusted position, an eccentric strap engaging the casing head and provided with a radial arm, a pin for transmitting motion to an indicator adjustable longitudinally on said arm, an eccentric strap engaging the eccentric head of the frame, means for securing said strap in adjusted position, and an arm carried by said strap and provided with a longitudinal slot in which said pin is fitted to travel.

4. In a pressure indicator of the character described, a housing having fluid intake and discharge ports, a pressure controlling valve in said housing comprising a shaft and slide valve members reciprocable in opposite directions in said housing and provided with ports for coaction with each other and with said ports of the cylinder, and a phase controller comprising a primary shaft driven by the engine under test, a secondary shaft coupled to the shaft of the valve, gearing between said primary and secondary shafts for transmitting motion from one to the other, and adjusting means operative through the gearing for changing the working relationship of the secondary shaft and the valve shaft with relation to the primary shaft for a phase varying action.

5. In a pressure indicator of the character described, a phase controller comprising an engine driven primary member and a valve operating secondary member, gears carried by said members for transmitting motion from the primary to the secondary member and operative by adjustment of the third member for shifting said secondary member relative to said primary member for a phase varying action, a crank for transmitting movement to an indicator from said third member, and eccentric means operative by adjustments of said third member for regulating the throw of said crank.

In testimony whereof I affix my signature.

KALMAN JUHASZ.